Feb. 17, 1942.  R. M. WOYTYCH  2,273,807
SPEED-CHANGE GEARING
Original Filed June 7, 1939   2 Sheets-Sheet 1
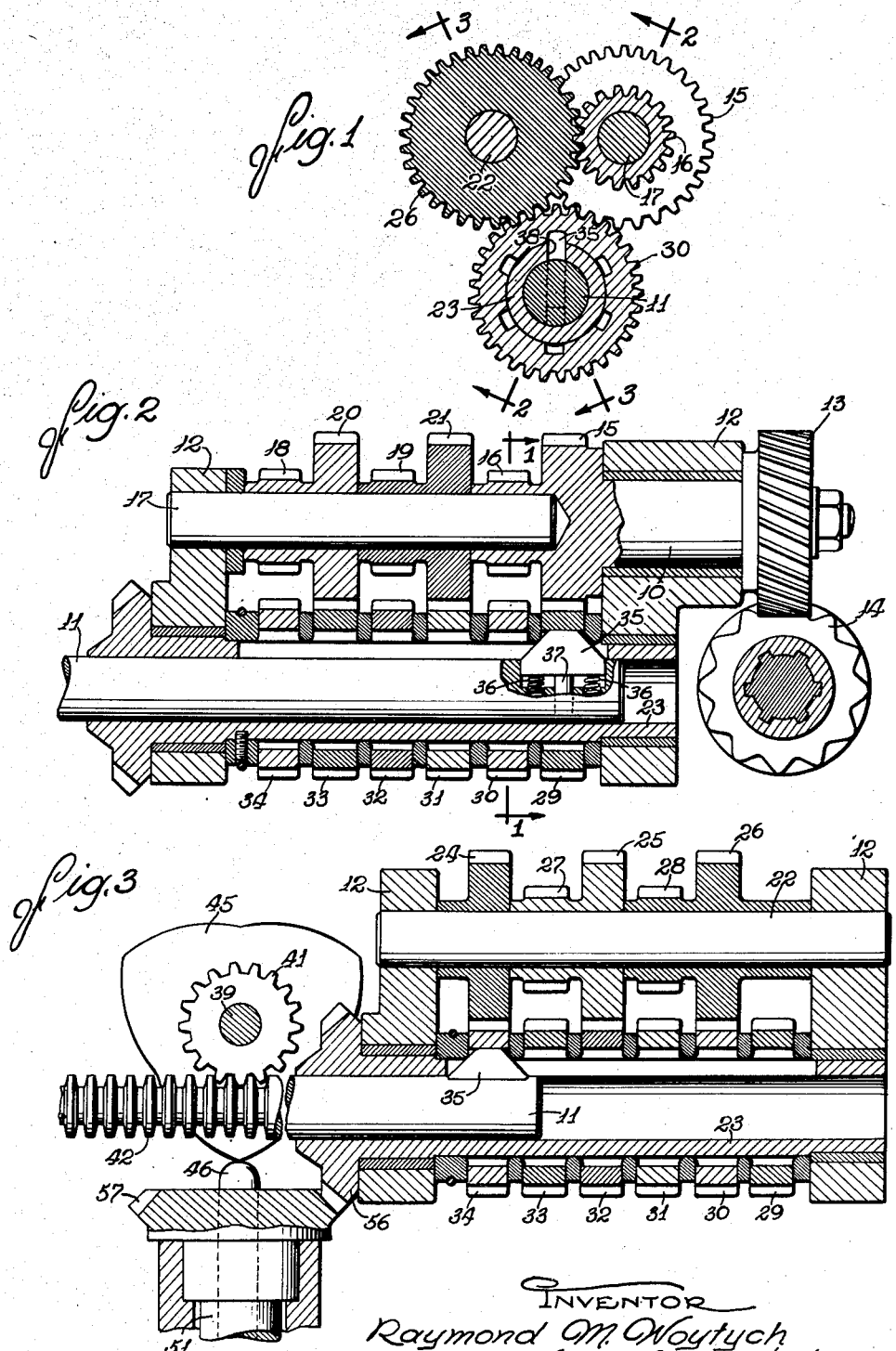
INVENTOR
Raymond M. Woytych
By Parker, Carlson, Pitzner & Hubbard
ATTORNEYS

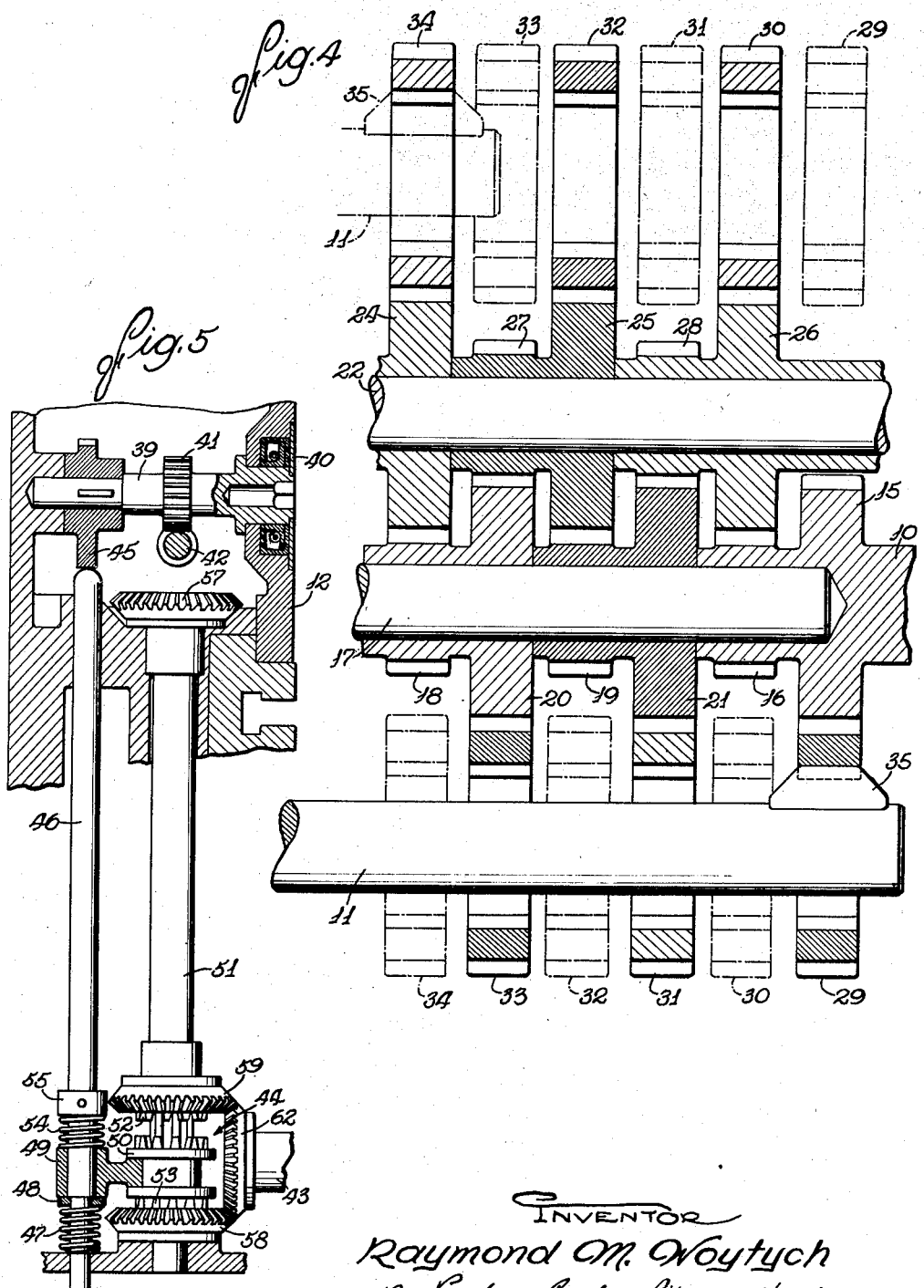

Patented Feb. 17, 1942

2,273,807

UNITED STATES PATENT OFFICE 2,273,807

SPEED-CHANGE GEARING

Raymond M. Woytych, Fond du Lac, Wis., assignor to Giddings & Lewis Machine Tool Co., Fond du Lac, Wis., a corporation of Wisconsin Original application June 7, 1939, Serial No. 277,757. Divided and this application April 15, 1940, Serial No. 329,699

3 Claims. (Cl. 74—371)

The invention relates to improvements in speed-change gearings. The present application is a division of my copending application Serial No. 277,757, filed June 7, 1939, Patent No. 2,269,641 issued January 13, 1942. In said copending application is described and claimed a facing attachment for horizontal boring, drilling and milling machines, the present speed-change gearing being particularly adapted for use in such a machine tool attachment although it will be plain to those skilled in the art that speed-change gearings embodying the present invention may also be desirably used in a wide variety of other types of installations.

One object of the present invention is to provide a speed-change gearing of novel form such that gears of small diameter serve to accomplish a wide range of speed adjustment.

A more specific object is to provide a speed-change gearing and a plurality of selectively available gear connections which bear an additive, and preferably true geometric-progression relation to each other.

Another object is to provide a speed-change gearing which is extremely compact and low in manufacturing cost.

Still another object is to provide a multiple-setting speed-change gearing in which means, including a reversing mechanism, is provided for automatically effecting a unidirectional rotation of the output shaft irrespective of the particular speed setting of the gearing.

Further objects and advantages of the invention will become apparent as the following description proceeds, taken in connection with the accompanying drawings in which:

Figure 1 is a transverse sectional view taken substantially along the line 1—1 in Fig. 2, of a speed-change gearing embodying the invention.

Figs. 2 and 3 are longitudinal sectional views taken respectively along the lines 2—2 and 3—3 of Fig. 1.

Fig. 4 is a generally diagrammatic layout or development of the gearing.

Fig. 5 is an end elevation, partially in section, of the automatic reversing mechanism associated with the speed-change gearing.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the illustrative embodiment of the invention, the speed-change gearing shown may be classified generally as of the drive key type, but it is of novel form such that gears of small diameter serve to accomplish a wide range of speed adjustments. The use of gears of small diameter is, in general, made possible by arranging the gearing so that the various selective gear combinations are additive, each speed setting bearing a direct geometric-progression relation to the other settings. In this way a gearing of small over-all dimensions is achieved suitable for housing within a confined space such, for example, as in a machine tool attachment head. The gearing herein shown is capable of six different speed settings, although it will be clear to those skilled in the art that a greater or lesser number may be provided as desired without departing from the disclosed plan or construction.

The speed-change gearing shown is interposed between a power inlet or driven shaft 10 (Fig. 2) and a power take-off or outlet shaft 23, a drive-key shaft 11 being axially slidable in the latter. The drive shaft 10 is, in the present instance, a stub shaft journaled in a suitable framework 12, and having fixed on its outer end a spiral gear 13, which is in turn driven by a meshing spiral gear 14. On the inner end of the shaft 14 is a first driving gear cluster including a gear 15 and a pinion 16. Coaxial with this gear cluster is a stationary shaft 17 also having loosely journaled thereon two further gear clusters each made up of one of the pinions 18 and 19, and a corresponding one of the gears 20 and 21. Further, the speed-change gearing includes a stationary intermediate shaft 22 (Figs. 1 and 3). On this intermediate shaft 22 are loosely journaled a gear 24 and two gear clusters made up respectively of gears 25 and 26, as well as pinions 27 and 28. On the shaft 23 six driven gears 29—34 are loosely journaled, which correspond to the six different speed settings of the speed-change gearing. To condition the gearing for a selected speed setting, the corresponding one of the driven gears is connected to the driven shaft 23 by a drive key 35 (Figs. 1 and 2). This drive key is of conventional form being yieldably urged into engagement with a registering one of the gears by springs 36. Pin 37 holds the drive key in position on the shaft 11 and the nose of the drive key projects through a slot 38 in the side wall of the tubular driven shaft 23 into engagement with a slot in the hub of the registering one of the driven gears (Fig. 1).

To shift the drive key 35 axially of the tubular shaft 23 into engagement with a selected one of the driven gears 29—34, a manually operable speed selection mechanism is provided. This mechanism includes a stub shaft 39 (Figs. 3 and 5) suitably journaled in the framework 12 and having a squared recessed end to receive a hand crank (not shown). A dial 40 indicates the speed setting. Fast on the stub shaft 39 is a pinion 41 meshing with a circular toothed rack 42 on the free end of the shaft 11 so that rotation of the pinion 41 serves to shift the shaft 11 axially and to bring the drive key 35 into engagement with the desired one of the driven gears.

The various trains of gears which are active for the different speed settings can best be seen by reference to the diagrammatic layout in Fig. 4. In this layout or development of the gearing the series of driven gears have been reproduced at both the top and bottom of the figure. In the event that the drive key 35 engages, for example, the driven gear 29 (as shown in full lines in Fig. 4) the drive is directly from the driving gear 15 to the meshing driven gear 29. Similarly, when the drive key 35 is shifted into engagement with the next driven gear 30 the drive is from the drive pinion 16 to the meshing intermediate gear 26 and thence to the driven gear 30. The table below sets out the gear connections for the six different settings of the speed-change gearing.

| Speed setting | Driven gear keyed to driven shaft | Gear train to selected driven gear |
|---|---|---|
| 1 | 29 | 15—29. |
| 2 | 30 | 16—26—30. |
| 3 | 31 | 16—26—28—21—31. |
| 4 | 32 | 16—26—28—21—19—25—32. |
| 5 | 33 | 16—26—28—21—19—25—27—20—33. |
| 6 | 34 | 16—26—28—21—19—25—27—20—18—24—34. |

From an inspection of the foregoing tabulation it will be seen that the various driven gears are meshed into the series train of cluster gears at successive points. In this way all of the gears used in the second setting are used in the third, all of those in the third are used in the fourth, etc. so that a minimum number of gears are required for maximum variations in speed.

In the illustrative construction all of the driven gears 29—34 are substantially identical and all have pitch circles the same as those of the gear 20 and the gears in the various clusters. Though the pinions are of the same diametrical pitch as the gears they may have any particular desired ratio of tooth number to that of the corresponding gears depending upon the speed reduction desired. By way of example, the pinions may all have eighteen teeth and the gears all thirty-three teeth. In such case the ratios of speeds for the six different settings of the gearing constitute a geometric progression, which is an especially desirable relation since from such a series may be quickly and easily selected a suitable drive speed for, say, a machine tool element.

The speed-change gearing described above is such that the direction of rotation of the driven shaft 23 is reversed for alternate settings of the speed-change gearing. It is desirable, however, that a final power take-off shaft 43 (Fig. 5) which the shaft 23 drives, as described below, be driven unidirectionally despite changes in speed as previously noted and, accordingly, a reversing clutch 44 is arranged to be automatically actuated in accordance with the setting of the speed-change gearing so as to compensate for the reversals in the speed-change gearing. To establish a driving connection between the driven shaft 23 and the outlet shaft 43, the former is connected by bevel gears 56, 57 with a rotatably journaled shaft 51. Loosely journaled on the lower portion of this shaft 51 are opposed bevel gears 58, 59 having fast on them, respectively, toothed clutch elements 52, 53 of the reversing clutch 44. The outlet shaft 43 has fixed on it a bevel gear 62 meshing with the bevels 58, 59. Accordingly, the reversing clutch 44 connects the intermediate shaft 51 to the outlet shaft 43 by alternatively connecting one or the other of the bevel gears 58, 59 to the shaft 51.

As a means of actuating the clutch 44 in response to changes in setting of the speed-change gearing a three lobe peripheral cam 45 (Figs. 3 and 5) is fixed on the setting-control shaft 39 of the speed-change gearing. An axially slidable cam follower rod 46 is urged against the cam 45 by a compression spring 47 bearing against a collar 48 pressed against a shoulder on the rod (Fig. 5). A clutch shifter shoe 49 slidably carried on the rod 46 serves to shift a toothed clutch driver 50 which is splined on the shaft 51, into engagement with one or the other of the toothed driven clutch members 52, 53. The cam 45 is indexed a sixth of a revolution for each step in the gear setting so it alternately brings a lobe and a depression into engagement with the cam follower rod 46 with the result that the upper and lower clutch members 52, 53 are alternately engaged.

To avoid jamming and breakage of the clutch by positive actuation of it by the cam 45 when the clutch teeth are not in registry, a yieldable connection is used between the cam follower rod 46 and shifter shoe 49. For this purpose a second compression spring 54 is interposed between the shifter shoe and a collar 55 pinned on the rod. With this arrangement when the rod 46 is pushed downward (as viewed in Fig. 5) by the cam 45, the thrust transmitted from the rod 46 through collar 55 and spring 54 compresses the lower spring 47, thereby permitting the shifter shoe 49 to move down and engage the clutch driver 50 with the lower clutch member 53. In the event that the teeth on clutch parts 50 and 53 are not in registry at the instant the rod 46 descends, however, the spring 54 is also compressed to store up the thrust force and thereafter expands to push the shifter shoe 49 down as soon as the teeth do register on further rotation of the shaft 51. Similarly, when the upper end of the rod 46 rides into a low point on the cam 45 the spring 47 is released to thrust the rod 46 and shifter shoe 49 upward. Since this upward thrust is applied by a yieldable spring, however, final upward movement of the clutch driver 50 to engage the driven member 52 does not take place until the mating teeth are in registry.

The bevel gears 58, 59 fixed to the clutch driven members 52, 53 respectively mesh with the bevel gear 62 (Fig. 5) on the outlet shaft 43 as heretofore noted, so that this shaft is driven through one or the other of the clutch gears 58, 59 depending upon the setting of the reversing clutch 44. Since the cam 45 is shifted coincidentally with changes in the speed-change gear setting the reversing clutch automatically retains the rotation of the shaft 43 unidirectional.

In view of the foregoing it will be apparent that I have provided a highly effectual and efficient speed-change gearing of extremely compact form. In addition to the small over-all dimensions of the gear used, despite the wide changes in speed ratios achieved, many of the gear elements are substantially duplicates so that manufacturing cost is also minimized.

I claim as my invention:

1. The combination of a gear train embodying a plurality of gears arranged in series relation and adapted to be driven in series from one terminal of the train, a plurality of freely and independently rotatable driven gears arranged with each one meshing with a different gear in said train, part of said driven gears being rotated in the opposite direction with respect to the remainder, a driven member, selector means for connecting any selected one of said driven gears in driving relation with said driven member, a rotatable power take-off device, means including a reversing clutch for connecting said driven member in driving relation with said power take-off device, and means for actuating said reversing clutch as an incident to the operation of said selector means for maintaining unidirectional rotation of said power take-off device irrespective of the direction of rotation of the selected driven gear.

2. In a speed-change gearing, the combination of a plurality of dual-unit gear clusters, each embodying a pinion and a gear fixed together and arranged coaxially, said gear clusters being arranged in series relation in a train with the pinion of each cluster meshing with the gear of the next cluster in the series, means for driving the train of clusters from one of the terminal clusters of the train, a plurality of independently rotatable driven gears each meshing with a different one of the cluster gears, whereby alternate ones of said driven gears are rotated in opposite directions with respect to each other, a driven member, selector means for connecting any selected one of said driven gears in driving relation with said driven member, a rotatable power take-off device, means including a reversing clutch for connecting said driven member in driving relation with said power take-off device, and means for actuating said reversing clutch as an incident to the operation of said selector means for maintaining unidirectional rotation of said power take-off device irrespective of the direction of rotation of the selected driven gear.

3. In a speed-change gearing, the combination of two sets of gear clusters arranged with the clusters in each set coaxial and with the axes of the two sets parallel, each of said clusters embodying a pinion and a gear coaxially arranged and fixed together, said clusters in both of said sets being arranged to mesh in a single series train with the pinion of each cluster in one set meshing with the corresponding gear in the other set of clusters, a plurality of independently rotatable driven gears each meshing with a different one of the cluster gears, a driven shaft, means journaling all of said driven gears for independent rotation about the axis of said driven shaft, means including a drive-key for connecting any selected one of said driven gears to said driven shaft, a rotatable power take-off device, means including a reversing clutch for connecting said driven shaft in driving relation with said power take-off device, and means for actuating said reversing clutch as an incident to a change in setting of said drive-key for maintaining unidirectional rotation of said power take-off device irrespective of the setting of said drive-key.

RAYMOND M. WOYTYCH.